United States Patent
Yellin et al.

(10) Patent No.: US 7,313,789 B1
(45) Date of Patent: Dec. 25, 2007

(54) METHODS AND SYSTEMS FOR REDUCING A PROGRAM SIZE

(75) Inventors: Frank N. Yellin, Redwood City, CA (US); Ioi K. Lam, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 705 days.

(21) Appl. No.: 10/789,530

(22) Filed: Feb. 27, 2004

(51) Int. Cl.
*G06F 9/45* (2006.01)
*G06F 9/44* (2006.01)

(52) U.S. Cl. ............... 717/151; 717/153; 717/154; 717/116; 717/148

(58) Field of Classification Search ............... 717/151, 717/153, 154, 116, 148; 711/132, 170; 707/206
See application file for complete search history.

(56) References Cited

U.S. PATENT DOCUMENTS

| | | | |
|---|---|---|---|
| 5,903,899 A * | 5/1999 | Steele, Jr. .................. 707/206 |
| 5,905,895 A * | 5/1999 | Halter ........................ 717/159 |
| 6,101,580 A * | 8/2000 | Agesen et al. ............. 711/132 |
| 6,192,517 B1 * | 2/2001 | Agesen et al. ............. 717/154 |
| 6,442,751 B1 * | 8/2002 | Cocchi et al. ............. 717/154 |
| 6,671,877 B1 * | 12/2003 | Ogasawara .................. 717/158 |
| 6,804,681 B2 * | 10/2004 | Sokolov et al. ......... 707/103 Z |
| 2004/0193828 A1 * | 9/2004 | Nevill ........................ 711/170 |

OTHER PUBLICATIONS

Corsaro, et al "Efficient Memory-Reference Checks for Real-time Java", 2003, ACM, p. 51-58.*
Agesen et al., "Finding References In Java™ Stacks," *Workshop on Garbage Collection and Memory Management*, OOPSLA, SML document #SML-E-97-67, pp. 1-7 (1997) <http://www-plan.cs.colorado.edu/diwan/class-papers/finding-references-in-java.pdf>.

* cited by examiner

*Primary Examiner*—Wei Zhen
*Assistant Examiner*—Qamrun Nahar
(74) *Attorney, Agent, or Firm*—Martine Penilla & Gencarella, LLP

(57) ABSTRACT

A method for reducing a size of an image of a class file is provided. In this method, a first stack map that is associated with a first bytecode of a method and a second stack map that is associated with a second bytecode of the method are provided. Next, an operation of the second bytecode is applied to determine an effect on the first stack map. The effected first stack map defines a resulting stack map. The resulting stack map is then compared with the second stack map. If the resulting stack map matches the second stack map, the second stack map is removed from the class file. The removal of the second stack map operates to reduce the size of the image of the class file.

19 Claims, 6 Drawing Sheets

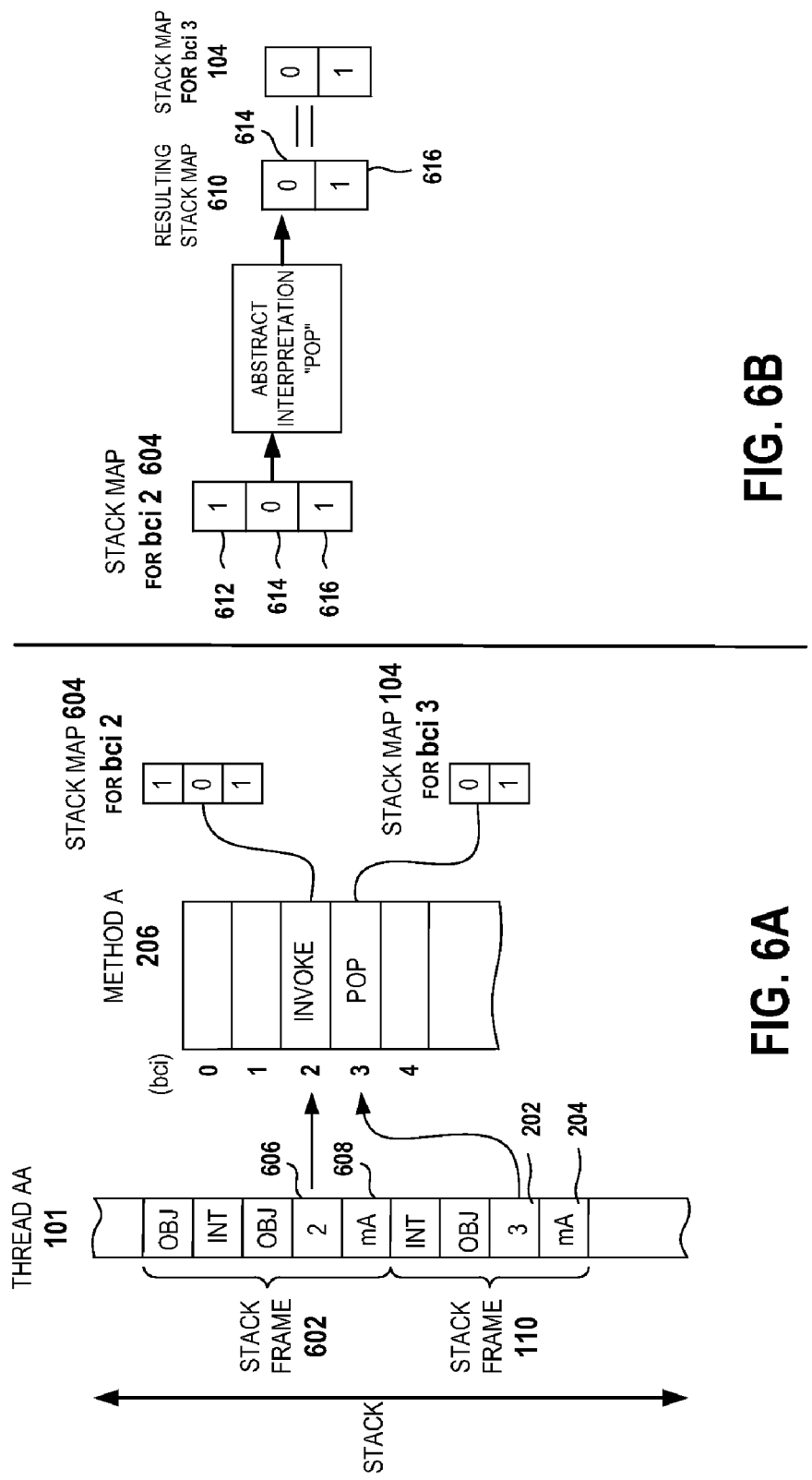

METHODS AND SYSTEMS FOR REDUCING A PROGRAM SIZE

BACKGROUND OF THE INVENTION

1. Field of the Invention

The present invention relates to computer programming languages and, more particularly, to methods and systems of reducing a program size.

2. Description of the Related Art

A stack based computer language, such as JAVA™ (hereinafter referred to as "Java"), basically puts and gets variables to and from a stack. As a result, the contents of the stack need to be identified at any given point of a program. To identify the contents of the stack, classes contain stack maps, which describe the state of the stack being executed at various points of the program. The stack maps constitute a significant amount of program size. For example, in Java, stack maps typically constitute 10% of a read-only memory (ROM) image. Having a small ROM image is particularly important for resource-constrained consumer devices such as cellular telephones, two-way pagers, and personal organizers. In view of the foregoing, there is a need to provide methods and systems for reducing the size of a program.

SUMMARY OF THE INVENTION

Broadly speaking, the present invention fills these needs by providing methods and a system for reducing a size of an image of a class file. It should be appreciated that the present invention can be implemented in numerous ways, including as a process, an apparatus, a system, computer readable media, or a device. Several inventive embodiments of the present invention are described below.

In accordance with a first aspect of the present invention, a method for reducing a size of an image of a class file is provided. In this method, a first stack map that is associated with a first bytecode of a method is provided and a second stack map that is associated with a second bytecode of the method is provided. Next, an operation of the second bytecode is applied to determine an effect on the first stack map. The effected first stack map defines a resulting stack map. The resulting stack map is then compared with the second stack map. If the resulting stack map matches the second stack map, the second stack map is removed from the class file. The removal of the second stack map operates to reduce the size of the image of the class file.

In accordance with a second aspect of the present invention, a computer readable medium having program instructions for reducing a size of an image of a class file is provided. This computer readable medium includes program instructions for providing a first stack map that is associated with a first bytecode of a method and a second stack map that is associated with a second bytecode of the method. Next, computer readable medium includes program instructions for deriving the second stack map from the first stack map by abstract interpretation of the second bytecode. If the second stack map is capable of being derived, the computer readable medium includes program instructions for removing the second stack map from the class file, whereby the removal of the second stack map operates to reduce the size of the image of the class file.

In accordance with a third aspect of the present invention, a system for reducing a size of a class file is provided. The system includes a memory for storing an abstract interpretation program module and a central processing unit for executing the abstract interpretation program module stored in the memory. The abstract interpretation program module includes: program instructions for providing a first stack map that is associated with a first bytecode of a method and a second stack map that is associated with a second bytecode of the method; program instructions for applying an operation of the second bytecode to determine an effect on the first stack map, the effected first stack map defining a resulting stack map; program instructions for comparing the resulting stack map with the second stack map; and if the resulting stack map matches the second stack map, program instructions for removing the second stack map from the class file, the removal of the second stack map operating to reduce the size of the image of the class file.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 6A and 6B are simplified schematic diagrams of an exemplary method operation for reducing a size of an image of a class file, in accordance with one embodiment of the present invention.

DETAILED DESCRIPTION OF THE EXEMPLARY EMBODIMENTS

Figure 1:
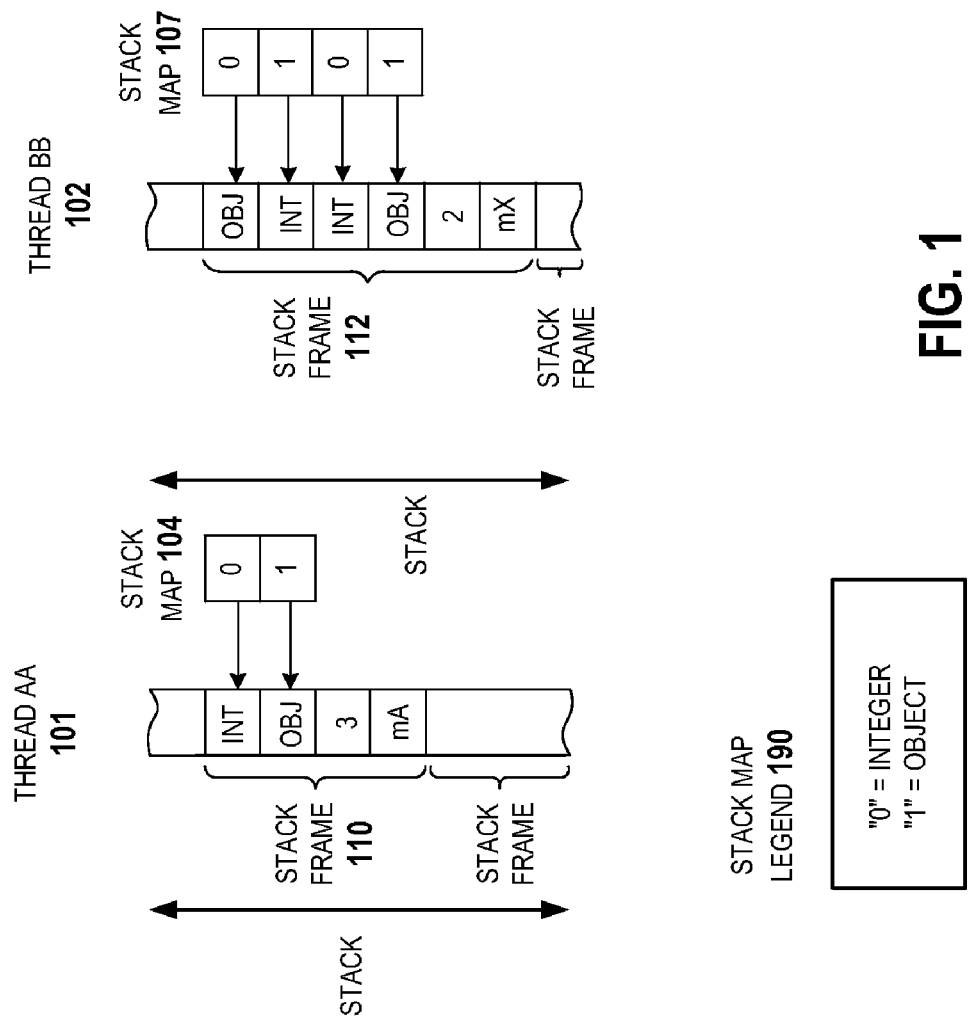
FIG. 1 shows a simplified schematic diagram of the relationship between threads, stacks, stack frames, and stack maps, in accordance with one embodiment of the present invention.

An invention is disclosed for methods and systems for reducing the size of a program. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

The embodiments described herein provide methods and systems for reducing the size of an image of a class file. The size of the image is reduced by removing redundant stack maps from the class files. In particular, as will be explained in more detail below, redundancy is determined by whether one stack map can be derived from another stack map. If the stack map can be derived, the stack map is removed from the class file, thereby reducing the size of the image of the class file.

As embodiments of the present invention can implement Java 2, Enterprise Edition (J2EE) or Java 2, Micro Edition (J2ME), a brief introduction to J2ME and J2EE architectures are provided below. J2ME platform is a Java platform for consumer and embedded devices such as mobile phones, Personal Digital Assistants (PDAs), TV set-top boxes, in-vehicle telematics systems, and a broad range of embedded devices. Similar to the enterprise (J2EE), desktop (J2SE™) and smart card (Java Card™) counterparts, the J2ME platform is a set of standard Java application program interfaces (APIs) defined through the Java Community Process$^{SM}$ program by expert groups that include leading device manufacturers, software vendors and service providers.

The J2ME platform delivers the power and benefits of Java technology tailored for consumer and embedded devices. The J2ME provides a flexible user interface, robust security model, broad range of built-in network protocols, and support for networked and disconnected applications. J2ME applications are written for a wide range of devices. As such, the J2ME applications can be downloaded dynamically and leverage each native capability of each device. The J2ME platform can be deployed on millions of devices (e.g., mobile phones, PDAs, automotive devices, etc.) supported by leading Java technology tools vendors and used by companies worldwide. Briefly stated, J2ME is the preferable platform for consumer and embedded devices.

The SDK provides software programmers with the speed, security and functionality to create cross-platform, mission critical applications. The JRE provides the execution environment needed to run Java platform-based applets and applications.

The J2ME architecture defines configurations, profiles and optional packages as elements for building complete Java runtime environments that meet the requirements for a broad range of devices and target markets. Each combination is optimized for the memory, processing power, and I/O capabilities of a related category of devices. The result is a common Java platform that fully leverages each type of device to deliver a rich user experience.

Configurations

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC), and the Connected Device Configuration (CDC):

CLDC

CLDC is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the Java platform implementation and the associated applications.

CDC

CDC is designed for devices having more memory, faster processors, and greater network bandwidth (e.g., TV set-top boxes, residential gateways, in-vehicle telematics systems, high-end PDAs, etc.). CDC includes a full-featured Java virtual machine, and a much larger subset of the J2SE platform than CLDC. As a result, most CDC-targeted devices have 32-bit CPUs and a minimum of 2 MB of memory available for the Java platform and associated applications.

Profiles

In order to provide a complete runtime environment targeted at specific device categories, configurations can be combined with a set of higher level APIs or profiles that further define the application life cycle model, the user interface, and access to device specific properties.

Mobile Information Device Profile

The Mobile Information Device Profile (MIDP) is designed for mobile phones and entry-level PDAs. Broadly speaking, MIDP can be used on any computing device that needs to take advantage of MIDP's functions. MIDP is a set of Java APIs which, together with CLDC, provides a complete J2ME application runtime environment targeted at mobile information devices, such as mobile phones and entry level PDAs. In this manner, MIDP offers the core application functionality required by mobile applications (e.g., the user interface, network connectivity, local data storage, and application management, etc.). Combined with CLDC, MIDP provides a substantially complete Java runtime environment that leverages the capabilities of handheld devices and minimizes both memory and power consumption.

Currently, CLDC, combined with the MIDP is the Java runtime environment for mobile information devices (MIDs) (e.g., phones, entry level PDAs, etc.). MIDP provides the core application functionality required by mobile applications (e.g., the user interface, network connectivity, local data storage, and application life-cycle management packaged as a standardized Java runtime environment and set of Java APIs, etc.).

Foundation Profile

CDC profiles are layered so that profiles can be added as needed to provide application functionality for different types of devices. The Foundation Profile (FP) is the lowest level profile for CDC and provides a network-capable implementation of CDC that can be used for deeply embedded implementations without a user interface. FP can also be combined with Personal Basis Profile and Personal Profile for devices that require a graphical user interface (GUI).

Personal Profile

The Personal Profile (PP) is the CDC profile aimed at devices requiring full GUI or Internet applet support (e.g., high-end PDAs, communicator-type devices, game consoles, etc.). PP includes the full Java Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

Personal Basis Profile

The Personal Basis Profile (PBP), is a subset of PP. PBP provides an application environment for network connected devices that support a basic level of graphical presentation or require the use of specialized graphical toolkits for specific applications devices (e.g., TV set-top boxes, in-vehicle telematics systems, information kiosks, etc.). Both PP and PBP are layered on top of CDC and FP.

Optional Packages

The J2ME platform can be further extended by combining various optional packages with CLDC, CDC, and their corresponding profiles. In this manner, specific market requirements can be addressed. Furthermore, optional packages can offer standard APIs for using both existing and emerging technologies (e.g., Bluetooth, Web services, wireless messaging, multimedia, database connectivity, etc.). As optional packages are modular, device manufacturers can include the optional packages, as needed, to fully leverage the features of each device.

By way of example, J2ME™ Mobile Media API Reference Implementation Version 1.0 (MMAPI) extends the functionality of the J2ME platform by providing audio, video and other time-based multimedia support to resource-constrained devices. MMAPI allows Java developers to gain access native multimedia services available on a given device.

The reference implementation for MMAPI runs on the CLDC/MIDP profile running on Windows 2000. By way of example, the reference implementation for NMAPI has support for simple tone generation, tone sequencing, audio/video file playback and streaming, interactive MIDI, and audio/video capture. The J2ME MMAPI reference implementation is a source code product provided for porting to various platforms. The MMAPI specification has been developed through the Java Community Process$^{SM}$ (i.e., JSR-135) by an expert group composed of companies representing device manufacturers, wireless operators and software vendors.

As the embodiments of the present invention can also involve using the J2EE platform, below are brief descriptions of the J2EE platform. The Java™ 2 Enterprise Edition (J2EE™), developed by Sun Microsystems, Inc., is the development and deployment environment for enterprise software applications capable of running on a variety of desktop computers, servers, and other computing devices. J2EE provides architecture for developing, deploying, and executing applications in a distributed-object environment. In one embodiment, the J2EE platform comprises the Java 2 Software Development Kit, Standard Edition (SDK), and Java Runtime Environment (JRE).

J2EE facilitates building Web-based applications. Broadly speaking, J2EE services are performed in the middle tier between the user browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. However, there exist a class of JAVA applications that require customization of the J2EE platform. These applications generally utilize application specific strategies created by a particular vendor to accomplish specific tasks that are not provided by the general JAVA platform on which the application executes. Examples of this class of JAVA applications include telecommunications applications and services that are deployed within a particular service provider's environment. This class of applications typically requires continuous availability, which means the environment in which the applications operate requires the applications to be available most of the time.

As J2ME and J2EE use the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent bytecode class files which are executed by a machine-dependent virtual machine. The virtual machine provides a level of abstraction between the machine independence of the bytecode classes and the machine-dependent instruction set of the underlying computer hardware. A class loader is responsible for loading the bytecode class files as needed, and an interpreter or just-in-time compiler provides for the transformation of bytecodes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping the overviews to Java, J2EE, and J2ME in mind, reference is made to FIG. 1 showing a simplified schematic diagram of the relationship between threads, stacks, stack frames, and stack maps, in accordance with one embodiment of the present invention. The Java virtual machine can support many threads of execution at once. These threads independently execute code that operates on values and objects residing in a shared main memory. Each thread has a private stack, created at the same time as the thread, and the stack stores stack frames. The Java virtual machine stack is analogous to the stack of another language such as C, which holds local variables and partial results, and plays a part in method invocation and return. The contents of the stack continuously change because different methods put different values on the stack.

As shown in FIG. 1, two threads, thread AA 101 and thread BB 102, are being executed at once. Each thread AA 101 and thread BB 102 has a private stack, and each stack stores stack frames 110 and 112. As is well known to those skilled in the art, stack frames 110 and 112 identify entries on the stacks and are used to store data and partial results, as well as to perform dynamic linking, return values for methods, and dispatch exceptions.

The contents of the stacks need to be determined at various points. For example, a feature of Java is its garbage-collected heap, which takes care of freeing dynamically allocated memory that is no longer referenced. During garbage collection, certain objects on the stacks need to be identified and marked as non-garbage. However, the entries within the stacks are not identifiable by examining the contents. For example, a stack entry may store integers or objects. Since the object and the integer both have 32-bit entries, one cannot differentiate the object from the integer by simply examining the content of the entry.

To identify the entries within the stack, stack maps 104 and 107 are inserted into a class file. Stack maps 104 and 107 consist of multiple entries, with each entry describing a state of a stack at various points of a program. In one embodiment, stack maps 104 and 107 identify entries of the stacks as objects or integers. For example, as shown in FIG. 1, each stack map 104 and 107 is associated with each stack frames 110 and 112, respectively. Each entry of stack map 104 and 107 is mapped to a corresponding entry in the stacks and is defined by a single bit of either a zero value or a one value. As indicated in legend 190, the zero bit entry in stack maps 104 and 107 indicates that the corresponding entry in the stack is an integer. The one bit entry in stack maps 104 and 107 indicates that the corresponding entry in the stack is an object. Alternatively, the zero bit entry may indicate an object while the one bit entry may indicate an integer. As a result, stack maps 104 and 107 make possible the identification and differentiation between objects and integers within the stacks.

Figure 2:
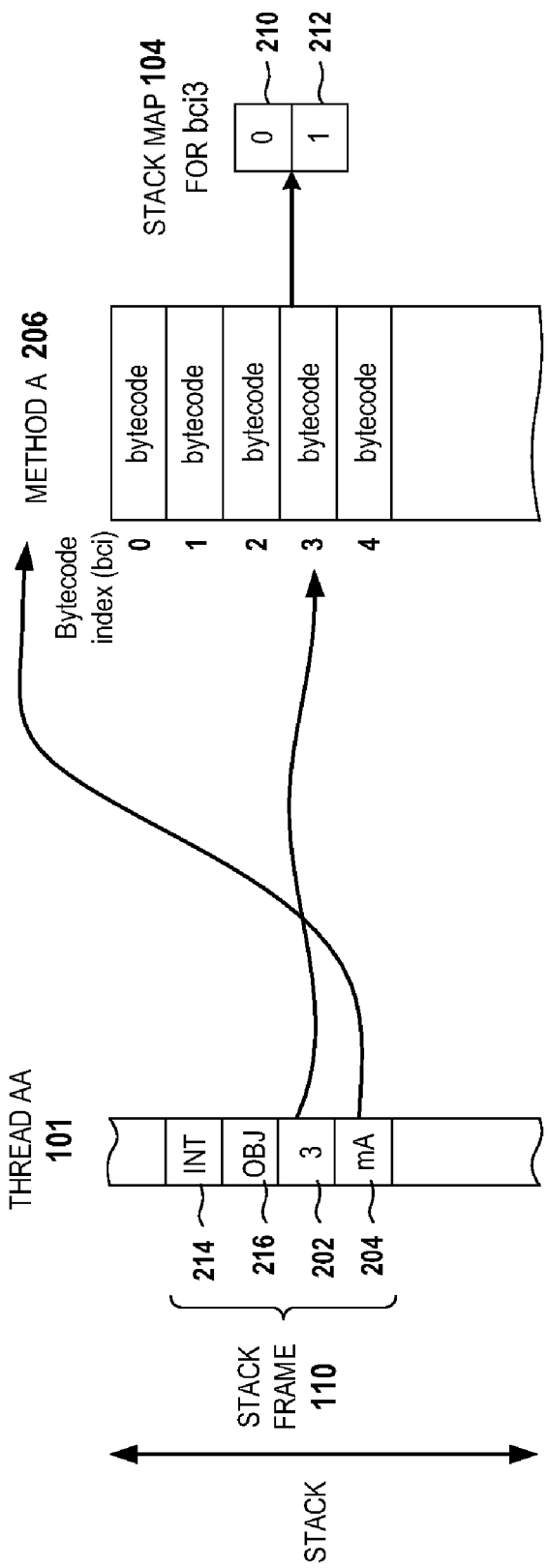
FIG. 2 is a simplified schematic diagram of the relationship between stack maps and methods, in accordance with one embodiment of the present invention.

FIG. 2 is a simplified schematic diagram of the relationship between stack maps and methods, in accordance with one embodiment of the present invention. In addition to integers and objects, the stack of thread AA 101 also includes bytecode index 202 and pointer 204 to Method A 206. As is well known to those skilled in the art, a method, such as Method A 206, contains bytecodes and declares executable code that can be invoked, passing a fixed number of values as arguments. A bytecode is a computer object code. For example, in Java, bytecodes are instructions to a Java virtual machine that specify the operation to be performed. Exemplary Java bytecode includes POP, POP2, DUP, DUP2, DUP_X1, DUP2_X1, DUP_X2, DUP2_X2, INVOKE, and SWAP. Correspondingly, bytecode index 202 refers to an offset of a bytecode in Method A 206. Thus, as shown in FIG. 2, bytecode index 202 with a value of three refers to a bytecode at the third offset in Method A 206.

A stack map, such as stack map 104, can be associated with a bytecode index of a method. However, not all bytecode indexes have a stack map. As is well known to those skilled in the art, stack maps are created for certain interesting points. An exemplary interesting point is at a target address of a branch instruction. Furthermore, as discussed above, stack map 104 identifies stack entries as objects or integers. As shown in FIG. 2, zero bit entry 210 in stack map 104 indicates that corresponding entry 214 in the stack is an integer. One bit entry 212 in stack map 104 indicates that corresponding entry 216 in the stack is an object.

Figure 3:
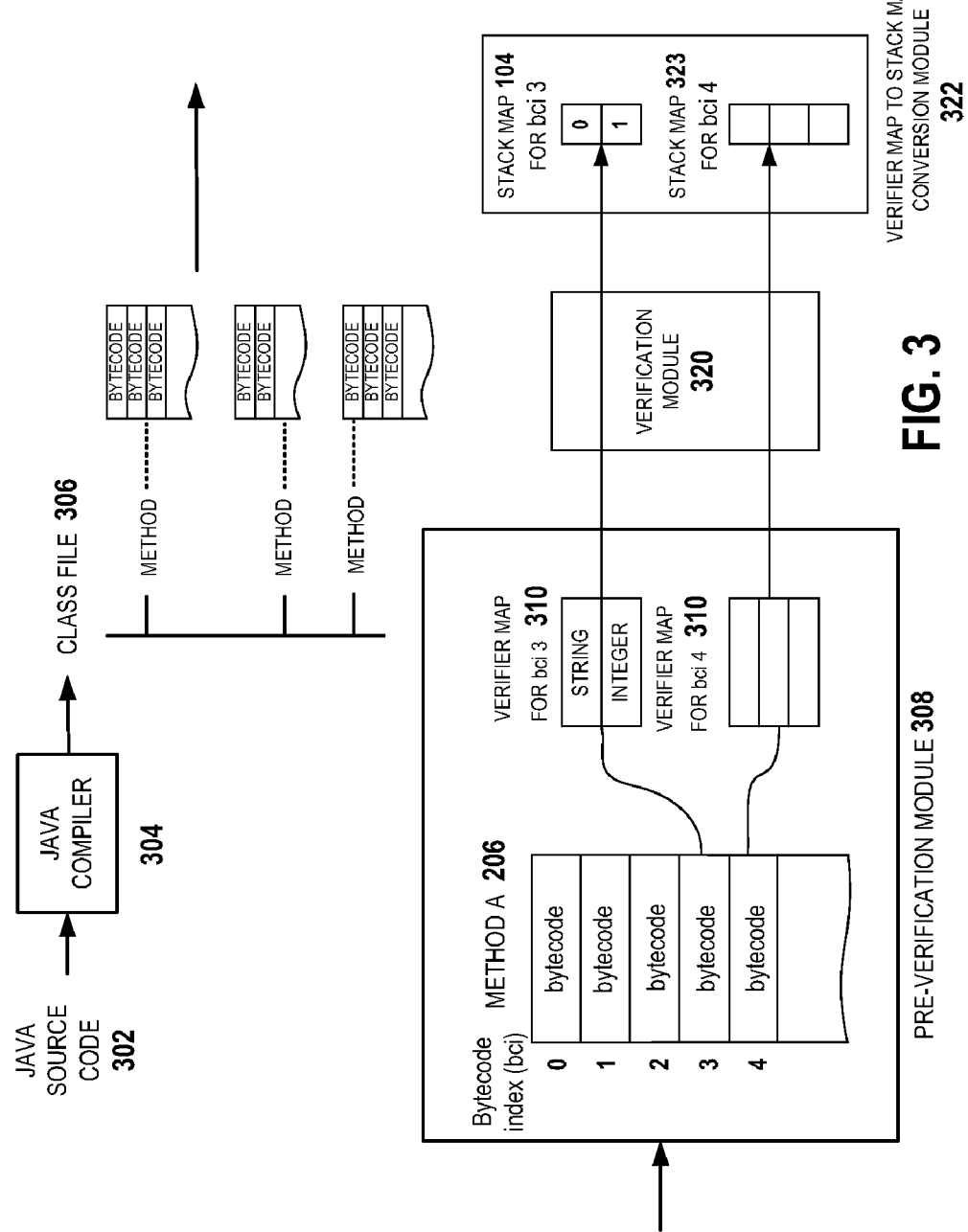
FIG. 3 is a simplified schematic diagram showing the creation of stack maps, in accordance with one embodiment of the present invention.

FIG. 3 is a simplified schematic diagram showing the creation of stack maps, in accordance with one embodiment of the present invention. As shown in FIG. 3, Java source code 302 is compiled by Java compiler 304 to produce class file 306. In Java, every method declaration belongs to some class, such as class file 306, and pre-verification module 308 analyzes each method in the class file. Pre-verification is typically performed on a server, a development workstation, or a desktop system before the class file is downloaded to a target device. During pre-verification, verifier maps 310 are created for certain interesting points. Verifier maps 310 are similar to a stack map but are more detailed. For example, verifier maps 310 have 32 bit entries while stack maps, in one exemplary embodiment, have one bit entries. Further, an entry of verifier maps 310 can specify either an object type or a primitive type. An object type identifies the class of the object (e.g., string, vector, file) and a primitive type is a boolean, an integer, a float, a double or a long.

Subsequently, class file 306 is verified by verification module 320. Verification ensures that the binary representation of a class or interface is structurally correct. For example, verification module 320 checks that every instruction has a valid operation code; that every branch instruction branches to the start of some other instruction, rather than into the middle of an instruction; that every method is provided with a structurally correct signature; and that every instruction obeys the type discipline of the Java programming language.

After verification, verifier maps 310 are compressed and converted into stack maps 104 and 323 by verifier map to stack map conversion module 322. Stack maps 104 and 323 enable a CLDC-compliant Java virtual machine to verify Java class files much more quickly and with substantially less virtual machine code and dynamic random access memory (RAM) consumption than the standard Java virtual machine verification step, but with the same level of security. Since stack maps, such as stack maps 104 and 323, have been implemented by utilizing the extensible attribute mechanism built in Java class files, class files containing stack maps will run unmodified in larger Java environments such as J2SE and J2EE, in accordance with one embodiment of the present invention. In another embodiment, the use of stack maps 104 and 323 may be incorporated into J2SE and J2EE.

Figure 4:
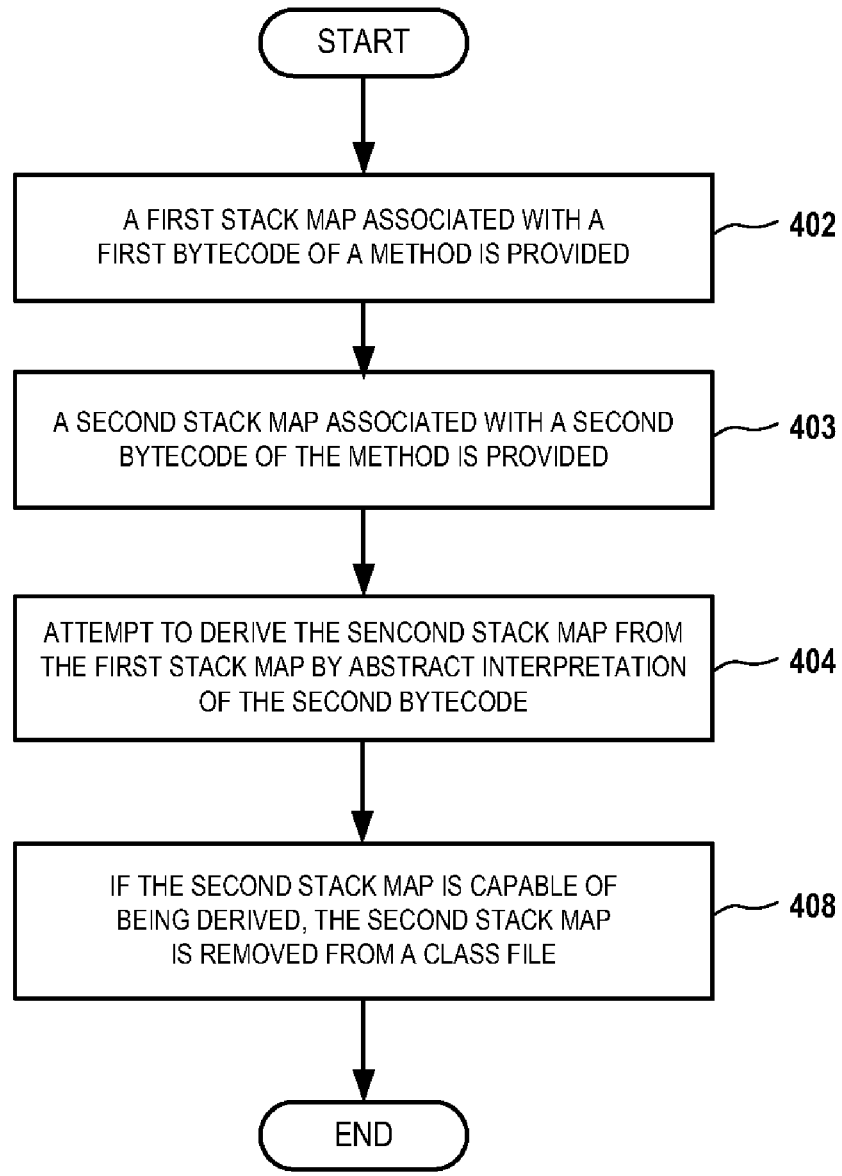
FIG. 4 is a flowchart diagram illustrating a high level overview of the method operations for reducing a size of an image of a class file, in accordance with one embodiment of the present invention.

FIG. 4 is a flowchart diagram illustrating a high level overview of the method operations for reducing a size of an image of a class file, in accordance with one embodiment of the present invention. Starting in operation 402, a first stack map associated with a first bytecode of a method is provided. At the same time, in operation 403, a second stack map associated with a second bytecode of the same method is provided. In other words, the first stack map is associated with a first bytecode index of the method and, likewise, the second stack map is associated with a second bytecode index of the same method.

Subsequently, in operation 404, an attempt is made to derive the second stack map from the first stack map by abstract interpretation of the second bytecode. During abstract interpretation, the operation of the second bytecode is not actually executed. In other words, classes are not actually loaded, linked, and initialized by a Java virtual machine. Instead, before actual execution, the operation of the second bytecode is applied in the abstract to determine an effect on the first stack map.

As will be explained in more detail below, if the second stack map is capable of being derived from the first stack map, the second stack map is removed from a class file in operation 408. The removal of the second stack map operates to reduce the size of the image of the class file. However, if the second stack map cannot be derived from the first stack map, the second stack map remains and is not removed from the class file.

Further, the above-described method operations for reducing the size of a class file can be embodied in a system. The system includes a memory for storing an abstract interpretation module that includes the above described method operations for reducing the size of the class file and a central processing unit for executing the abstract interpretation program module stored in the memory.

Figure 5:
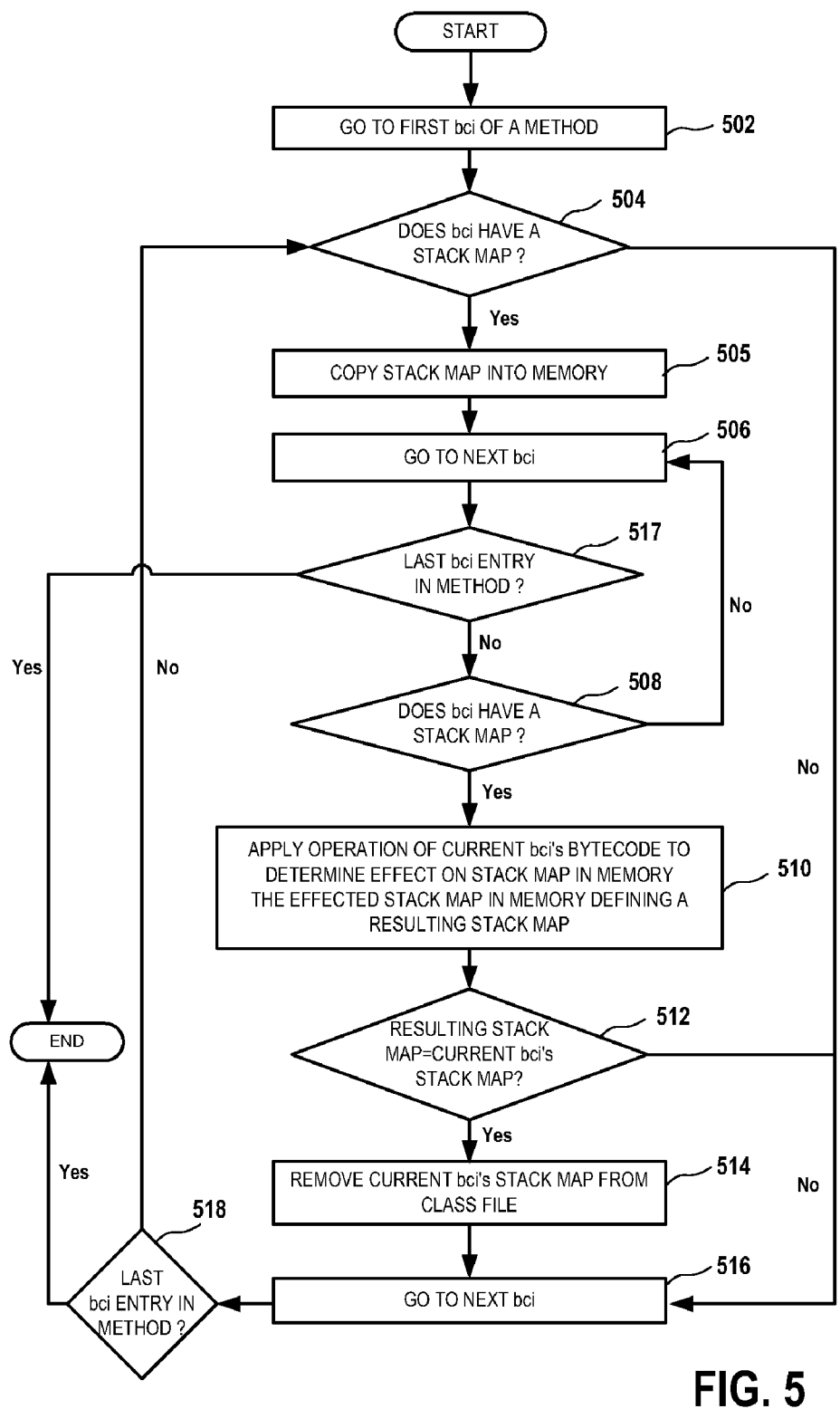
FIG. 5 is a flowchart diagram illustrating the detailed method operations for reducing a size of an image of a class file, in accordance with one embodiment of the present invention.

FIG. 5 is a flowchart diagram illustrating the detailed method operations for reducing a size of an image of a class file, in accordance with one embodiment of the present invention. Starting in operation 502, a first bytecode index of a method (e.g., bytecode index 1) is referenced. However, in another embodiment, any bytecode index of the method may be initially referenced. Thereafter, in operation 504, a check is conducted to determine whether a stack map is associated with the currently referenced bytecode index of the method. If there is no stack map, a next, incremental bytecode index, (e.g., bytecode index 1) is referenced. The bytecode index increments may be positive or negative. For example, the bytecode index may increment by one or decreased by one. Additionally, any suitable number of bytecode index increments may be used (e.g., increment by +1, +2, +3, −1, −2, −3, etc.).

If there is a stack map associated with the currently referenced bytecode index of the method, the stack map is copied into a memory in operation 505 for subsequent reference. A next, incremental bytecode index is then referenced in operation 506 and another check is conducted in operation 508 to determine whether the currently referenced bytecode index has a stack map. If there is a stack map, abstract interpretation is used in operation 510 to derive the stack map associated with the currently referenced bytecode index from the stack map stored in memory. However, if there is no stack map, operations 506 and 508 repeat until a stack map is found or, as shown in operation 517, until all the bytecode index entries are checked.

In operation 510, an attempt is made to derive the stack map associated with the currently referenced bytecode index from the stack map stored in memory. As discussed above, during abstract interpretation, the operation of the bytecode is not actually executed. Instead, the bytecode operation of the currently referenced bytecode index is applied to determine the effect on the stack map stored in memory. For example, a POP bytecode operation deletes the top entry of a stack. Since the top entry of the stack is deleted, the effect on the stack map stored in memory is the deletion of the top entry of the stack map. In effect, the bytecode operation operates on the stack and, as a result, the corresponding stack maps are modified. In another example, a SWAP bytecode operation swaps the top two stack entries. Accordingly, the effect of the application of the SWAP bytecode operation is the swapping of the top two corresponding entries in the stack map stored in memory.

For reference purposes, the effected stack map stored in memory defines a resulting stack map. The resulting stack map is then compared to the stack map associated with the currently referenced bytecode index in operation 512. If the resulting stack map matches the stack map associated with the currently referenced bytecode index, the stack map associated with the currently referenced bytecode index is capable of being derived from the previous stack map. In this case, the stack map associated with the currently referenced bytecode index is removed from the class file in operation 514, thereby operating to reduce the size of the image of the class file. The operation then references a next, incremental bytecode index at operation 516 and the operations described above basically repeat until all the bytecode indexes of the method are referenced, as shown in operation 518.

Nonetheless, if the resulting stack map does not match the stack map associated with the currently referenced bytecode index in operation 510, the stack map associated with the currently referenced bytecode index cannot be derived from the previous stack map. In this case, the stack map associated with the currently referenced bytecode index is not removed from the class file and a next, incremental bytecode index at operation 516 is referenced.

FIG. 6A is a simplified schematic diagram of an exemplary method operation for reducing a size of an image of a class file, in accordance with one embodiment of the present invention. As shown in FIG. 6A, thread AA 101 has a stack and the stack includes stack frames 602 and 110. In addition to integers and objects, stack frames 602 and 110 also include bytecode indexes 606 and 202 and pointers 204 and 608 to Method A 206. Method A 206 contains bytecode INVOKE at bytecode index 2, and stack map 604 is associated with bytecode index 2. Method A 206 also contains bytecode POP at bytecode index 3, and stack map 104 is associated with bytecode index 3.

In accordance to the exemplary method operations shown in FIG. 5, a first bytecode index 0 of Method A 206 is referenced. Since there is no stack map associated with bytecode index 0, a next, incremental bytecode index 1 is referenced. Similarly, there is no stack map associated with bytecode index 1. As such, a next, incremental bytecode index 2 is referenced. In this case, stack map 604 is associated with bytecode index 2 and, as a result, the stack map is copied into a memory for subsequent reference.

A next, incremental bytecode index 3 is then referenced and a check reveals that stack map 104 is associated with bytecode index 3. As a result, abstract interpretation is used to derive stack map 104 associated with bytecode index 3 from stack map 604 associated with bytecode index 2. To attempt to derive stack map 104, the POP bytecode operation is applied to determine the effect on stack map 604 stored in memory. As discussed above, the POP bytecode operation deletes the top entry of the stack. Since the top entry of the stack is deleted, the effect on stack map 604 stored in the memory is the deletion of top entry of the stack map. As shown in FIG. 6B, stack map 604 associated with bytecode index 2 includes one bit top entry 612, zero bit second entry 614, and one bit third entry 616. The POP bytecode operation deletes the top entry of the stack and, as a result, the corresponding one bit top entry 612 of stack map 604 is deleted.

For reference purposes, the effected stack map 604 without one bit top entry 612, which is stored in memory, defines resulting stack map 610. Resulting stack map 610 is then compared with stack map 104 associated with bytecode index 3. Resulting stack map 610 and stack map 104 associated with bytecode index 3 match because both stack maps have zero bit top entries and one bit second entries. As a result, stack map 104 can be derived from stack map 604 and stack map 104 associated with bytecode index 3 is removed from the class file, thereby operating to reduce the size of the image of the class file.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for reducing a size of an image of a class file, comprising:
    providing a first stack map that is associated with a first bytecode of a method and a second stack map that is associated with a second bytecode of the method;
    deriving a resulting stack map by applying an abstract interpretation operation of the second bytecode to determine an effect on the first stack map wherein during abstract interpretation operation, before execution of an operation of the second bytecode, the operation of the second bytecode is applied in abstract to determine the effect on the first stack map;
    comparing the resulting stack map with the second stack map; and
    if the resulting stack map matches the second stack map, removing the second stack map from the class file, the removal of the second stack map operating to reduce the size of the image of the class file.

2. The method of claim 1, wherein the second stack map is capable of being derived from the first stack map when the resulting stack map matches the second stack map.

3. The method of claim 1, wherein the operation of the second bytecode operates on a stack.

4. The method of claim 1, wherein each of the first and second bytecode is a computer object code.

5. The method of claim 4, wherein each of the first and second bytecode is defined by one or more of a POP, a POP2, a DUP, a DUP2, a DUP_X1, a DUP2_X1, a DUP_X2, a DUP2_X2, an INVOKE, and a SWAP.

6. The method of claim 1, wherein each of the first, second, and resulting stack maps is an entry that describes a state of a stack at various points of a program.

7. The method of claim 1, wherein each of the first, second, and resulting stack maps is an entry that identifies a stack entry as an integer or an object.

8. The method of claim 7, wherein the entry is a single bit defined by one of a zero value or an one value.

9. The method of claim 1, wherein the image is a read-only memory (ROM) image capable of being executed by a virtual machine.

10. A computer readable storage medium having program instructions for reducing a size of an image of a class file, comprising:
    program instructions for providing a first stack map that is associated with a first bytecode of a method and a second stack map that is associated with a second bytecode of the method;
    program instructions for deriving a resulting stack map by applying an abstract interpretation operation of the second bytecode to determine an effect on the first stack map, wherein during abstract interpretation operation, before execution of an operation of the second bytecode, program instructions for applying the operation of the second bytecode in abstract to determine the effect on the first stack map;
    program instructions for comparing the resulting stack map with the second stack map; and
    if the resulting stack map matches the second stack map program instructions for removing the second stack map from the class file, the removal of the second stack map operating to reduce the size of the image of the class file.

11. The computer readable storage medium of claim 10, wherein the second stack map is capable of being derived from the first stack map when the resulting stack map matches the second stack map.

12. The computer readable storage medium of claim 10, wherein the operation of the second bytecode operates on a stack.

13. The computer readable storage medium of claim 10, wherein each of the first and second bytecode is a computer object code.

14. The computer readable storage medium of claim 13, wherein each of the first and second bytecode is defined by one or more of a POP, a POP2, a DUP, a DUP2, a DUP_X1, a DUP2_X1, a DUP_X2, a DUP2_X2, an INVOKE, and a SWAP.

15. The computer readable storage medium of claim 10, wherein each of the first and second stack maps is an entry that describes a state of a stack at various points of a program.

16. The computer readable storage medium of claim 10, wherein each of the first and second stack maps is an entry that identifies a stack entry as an integer or an object.

17. The computer readable storage medium of claim 16, wherein the entry is a single bit defined by one of a zero value or an one value.

18. The computer readable storage medium of claim 10, wherein the image is a read-only memory (ROM) image capable of being executed by a virtual machine.

19. A system for reducing a size of a class file, comprising:
   a memory for storing an abstract interpretation program module; and
   a central processing unit for executing the abstract interpretation program module stored in the memory, the abstract interpretation program module including,
      program instructions for providing a first stack map that is associated with a first bytecode of a method and a second stack map that is associated with a second bytecode of the method;
      program instructions for deriving a resulting stack map by applying an abstract interpretation operation of the second bytecode to determine an effect on the first stack map, wherein during abstract interpretation operation, before execution of an operation of the second bytecode, program instructions for applying the operation of the second bytecode in abstract to determine the effect on the first stack map
      program instructions for comparing the resulting stack map with the second stack map; and
      if the resulting stack map matches the second stack map, program instructions for removing the second stack map from the class file, the removal of the second stack map operating to reduce the size of an image of the class file.

* * * * *